Feb. 12, 1952      H. WEBER      2,585,358
CABLE TENSION REGULATOR
Filed Feb. 1, 1951      3 Sheets-Sheet 1
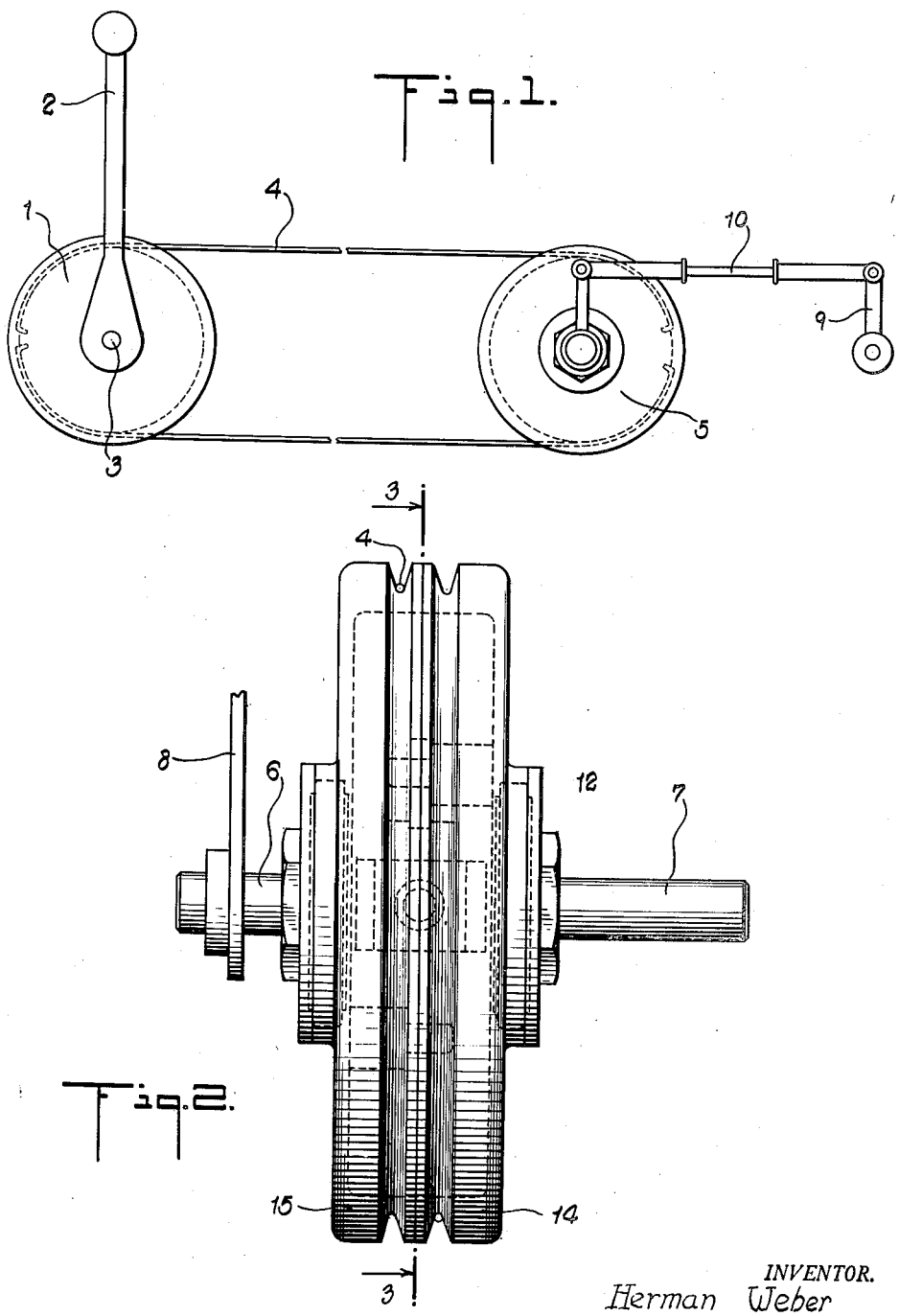
INVENTOR.
Herman Weber
BY
Kenyon & Kenyon
ATTORNEYS Feb. 12, 1952

H. WEBER 2,585,358

CABLE TENSION REGULATOR

Filed Feb. 1, 1951

INVENTOR.
Herman Weber
BY
Kenyon & Kenyon
ATTORNEYS

Patented Feb. 12, 1952

2,585,358

UNITED STATES PATENT OFFICE 2,585,358

CABLE TENSION REGULATOR

Herman Weber, Kalamazoo, Mich., assignor to Shakespeare Products Company, Kalamazoo, Mich., a corporation of Michigan Application February 1, 1951, Serial No. 208,860

14 Claims. (Cl. 74—501.5)

This invention relates to cable tension regulators for use in connection with cable control devices such as are commonly used for remote control operation of various mechanisms and particularly for cable controls for fins, ailerons, elevators, engine controls and other airplane parts. It is particularly applicable for airplane controls in planes which are employed in high altitude work because of the wide range of temperature encountered and because the basic structure is usually of aluminum while the control cables are of steel. In large planes the differences in coefficients of expansion and contraction of the aluminum and the steel are so great that very material slack may be encountered if the cables are set for proper tension at a given temperature representing the extreme of expansion differential.

An object of this invention is to provide a cable tension regulator adapted to take care of wide ranges of expansion differential such as above outlined while maintaining a substantially constant tension on the control cables.

Another object is to provide such a cable tension regulator which is simple and inexpensive.

Another object is to provide such a cable tension regulator which is compact and light in weight and which is preferably made as a self-contained unit which may be installed in place of simple sheaves which do not incorporate the tension regulator mechanism.

Another object is to provide such a cable tension regulator which will take up large expansion differentials.

Another object is to provide a cable tension regulator which has a positive locking mechanism which assures resistance to the controls which is commensurate with the controlling movement imparted to the control without backplay or backlash and in which there is a positive lock.

Another object is to provide such a cable tension regulator in which the position of neither the part to be controlled nor the controlling part is altered by the operation of the tension regulation.

Other objects and advantages of the invention will be apparent from a consideration of the specification and of the drawings in which:

Fig. 1 is a side elevational view of the essential working portions of a cable control mechanism embodying the invention;

Fig. 2 is an end elevational view of the cable tension regulator;

Figure 3:
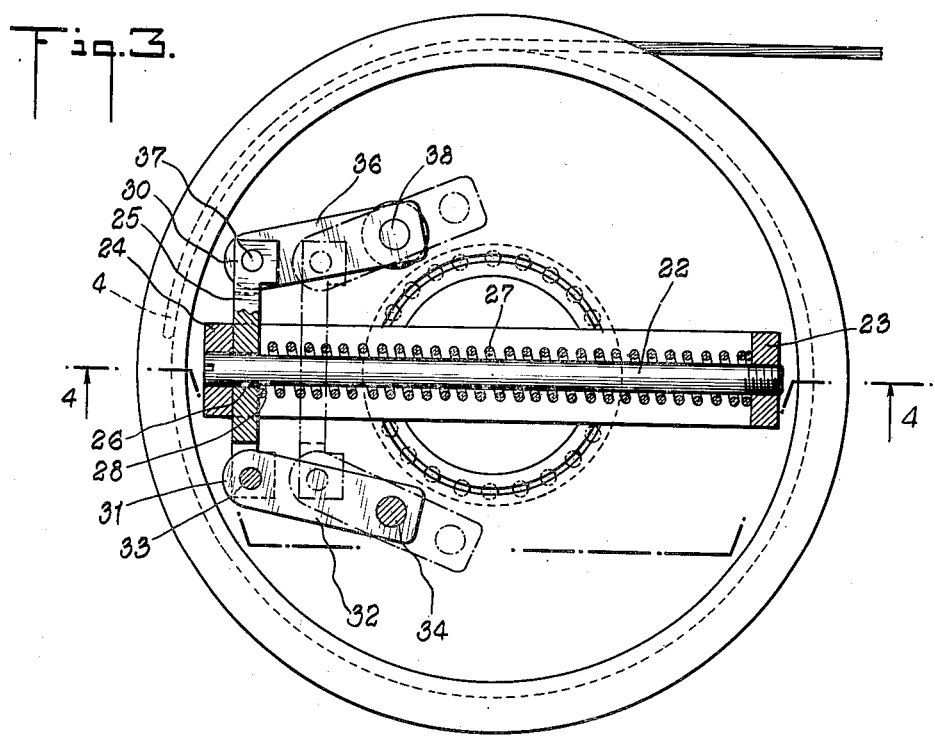
Fig. 3 is a detailed sectional view of the cable tension regulator taken on the line 3—3 of Fig. 2.
Figure 4:
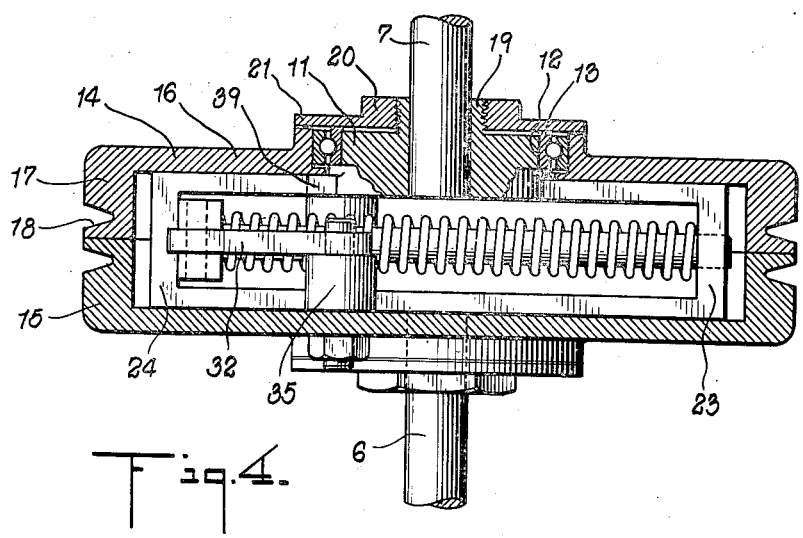
Fig. 4 is a detailed sectional view of the cable tension regulator taken on the line 4—4 of Fig. 3.

The invention consists generally of a driving member which is affixed to a shaft. There are a pair of sheaves mounted for independent rotation about the shaft, each adapted to receive one end of a flexible cable. In the preferred form of the invention these sheaves are rotatably mounted on the driving member which is affixed to the shaft and are of concavo-convex form and are opposed to form a housing for the rest of the mechanism.

Equalizing means are provided for rotating these sheaves in opposite directions to take up slack in the cable. A spring is provided for actuating the equalizing means which consists of a lock bar which is slidably fitted on a slide or rod and which has its opposite ends connected to different sheaves through linkage or gearing. A positive lock is obtained through the application of rotational force to one only of the sheaves. This applies a force to one end of the lock bar, which is canted so that it locks on its guide or rod, thus locking the sheaves and the guide members together.

The spring means which operates the equalizing means is preferably centrally disposed so that it can move the equalizing means along its guide without canting, since the forces are applied equally. This permits the spring through the equalizing means to rotate the sheaves in opposite directions to take up slack.

In the form of invention shown in Figs. 1–4 there is provided a sheave 1 with an operating lever 2 for operation at the control station such as the central engine control point of a plane. It is mounted on a shaft 3 which is provided with suitable bearings which are not shown.

A flexible cable 4 extends to the tension control unit which is shown generally at 5 and which is provided with a shaft section 6 and a shaft section 7 which are mounted in a suitable bearing which is not shown. A crank lever 8 is connected to the shaft 6 and is connected to a lever 9 for controlling the mechanism to be controlled through a pitman 10.

The cable tension regulating mechanism consists of a driving member 11 which is mounted on the shaft sections 6 and 7 and is fixed thereto in driving relationship by any suitable means. Shoulders such as the shoulder 12 are provided at each end of the driving member to seat below bearings 13 to receive sheaves 14 and 15 to mount them for free rotation about the axis of the shaft. Each of the sheaves 14 and 15 is concavo-convex in form, as can best be seen from Fig. 4. Each consists of a plate 16 and a flange 17 which is grooved at 18 to receive an end of the flexible cable 4, which is anchored in the sheave. At each end of the driving member is a screw-threaded sleeve 19 which receives a nut 20 which is provided with a retaining flange 21 which retains the sheave in position. The sheaves are mounted in contiguous relationship with their flanges 17 substantially meeting to form a housing for the remaining mechanism, so that the tension regulator is a self-contained housed unit which may be installed in place of the plain sheave which is ordinarily employed on controls of the type here involved.

A rod or guide 22 is mounted between suitable supports 23 and 24 on the driving member 11. It extends in a radial direction with respect to the axis of the shaft and of the tension regulator. A lock bar 25, which is centrally apertured at 26, is slidably fitted on the rod 22. The aperture 26 is slightly larger in diameter than the diameter of the rod 22 so that the lock bar may slide freely along the rod 22. A compression spring 27 engages the lock bar 25 centrally at 28 and engages the support 23. This spring preferably surrounds the rod 22 so that it will be retained in position. It is biased to urge the lock bar 25 to the left, as viewed in Figs. 3 and 4.

The lock bar extends in a generally circumferential direction with its ends 30 and 31 at opposite sides of the rod 22. A link 32 is pivotally connected at 33 to the end 31 at the lock bar 25 and is pivotally connected at 34 to a stud 35 on the sheave 15. A link 36 is pivotally connected to the other end 30 of the lock bar 25 at 37; its other end is pivoted at 38 to the sheave 14 through a stud 39.

The lock bar 25 is shown in full lines in Fig. 3 at its position of maximum slack takeup. When, due to the differences between the coefficients of expansion, there has been produced less slack, the lock bar will be moved to the dotted line position of Fig. 3 against the force of the spring 27 which maintains a substantially constant tension at all times. This is done through rotation of the sheaves 14 and 15 in opposite directions and the connecting linkage 32 and 36. When there is more slack than is indicated at the position shown in dotted lines, it is taken up through movement to the left, as viewed in Fig. 3. When there is less slack, the lock bar will move farther to the right, thus providing a long takeup capable of handling large amounts of slack.

When the control is operated it results in a pull on either one or the other of the ends of the cable 4. This pull is translated into rotational movement of the sheave to which the end of the cable which is pulled is attached. For instance, a pull which would rotate sheave 15 in a counterclockwise direction, as viewed in Fig. 3, would exert a pull through the link 32 on the end 31 of the lock bar. Since there is no like pull on the sheave 14 at the same time there will be an unequal application of force to the lock bar 25. This will cant the lock bar 25 on the rod 22, thus positively locking the lock bar. This not only locks the bar in position so that it cannot be moved by the spring or any other force, but it also locks the two sheaves to the driving member. In the preferred form of the invention the clearance between the rod 22 and the aperture 26 is just sufficient to permit easy sliding when balanced forces are applied to the lock bar. This means that there is a prompt positive locking so that there is substantially no backlash.

Figure 5:
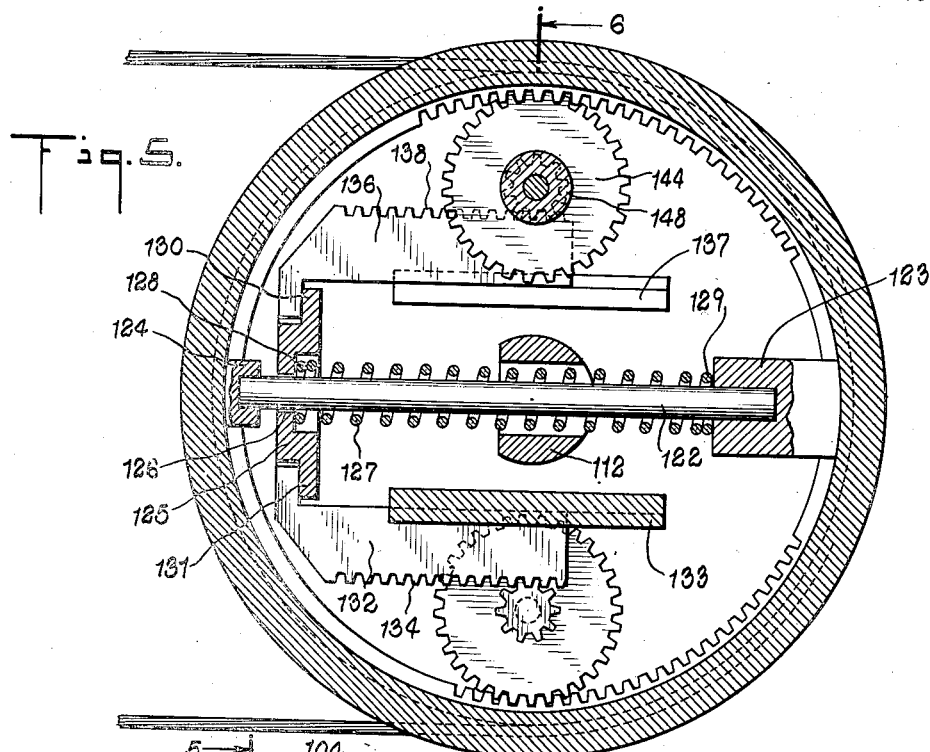
Fig. 5 is a detailed sectional view of a different form of the invention taken on the line 5—5 of Fig. 6.
Figure 6:
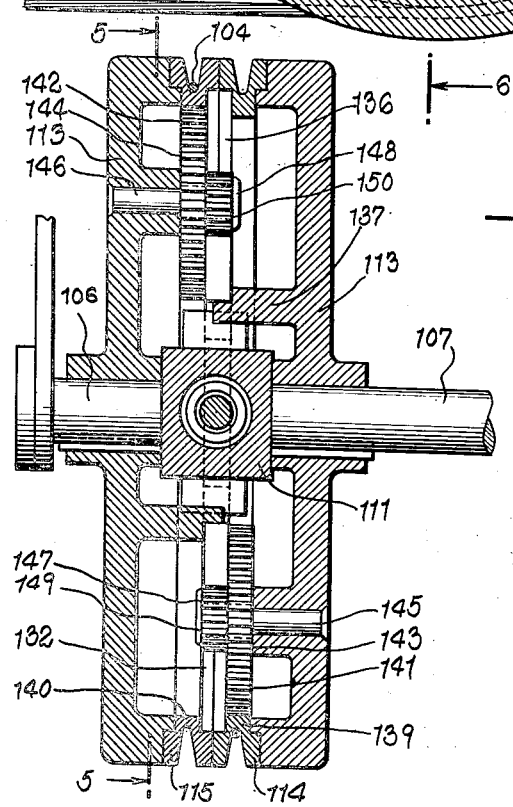
Fig. 6 is a detailed sectional view of the form of invention shown in Fig. 5 taken on the line 6—6 of Fig. 5.

In the form of invention shown in Figs. 5 and 6 shaft sections 106 and 107 are keyed into the driving member 111 which consists of a central portion 112 and side members 113. Sheave members 114 and 115 are mounted for rotation in suitable grooves formed in the periphery of the driving member. A central rod 122 is provided and extends between supports 123 and 124. Lock bar 125, which is similar to the lock bar 25 is centrally apertured at 126 for a sliding fit on the rod 122. The spring 127 which surrounds the rod 122 bears centrally on the lock bar 125 at 128 and on the support 123 at 129, tending to urge the lock bar to the left, as viewed in Fig. 5. The ends 130 and 131 of the lock bar engage racks which form a driving connection to the sheave members 114 and 115. The rack 132 engages the end 131 of lock bar 125. It is mounted in a suitable slide 133 on the member 111 and is provided with gear teeth 134. The rack 136 is mounted in a slide 137 on the member 111 and is provided with gear teeth 138. The sheave 114 is provided with internal gear teeth 139 and the sheave 115 is provided with internal gear teeth 140. These teeth mesh respectively with gear teeth 141 and 142 on gears 143 and 144, respectively. These gears are suitably mounted for rotation on the member 111 by means of pins 145 and 146. Gears 147 and 148 mounted respectively on pins 145 and 146 and fixed with relation to gears 143 and 144 for rotation therewith have gear teeth 149 and 150 for engagement respectively with the gear teeth 134 and 138.

In Fig. 5 the lock bar 125 is shown in the position of greatest slack takeup. When there is less slack the lock bar 125 moves to the right, as viewed in Fig. 5. When there is a pull on the end of the cable 104, which is attached to sheave 115, which is the end at the top of Fig. 5, sheave 115 is rotated in a counterclockwise direction. This in turn rotates the gears 144 and 148 in a counterclockwise direction. This drives the rack 136 to the right; as viewed in Fig. 5, pulling on the end 130 of lock bar 125, canting it on shaft 122 and positively locking it. This also locks the spring 127 and locks the sheaves 114 and 115 to the member 111 so that all rotate as a unit and drive the shaft.

When there is a pull on the other end of the cable 104, sheave 114 through its locking mechanism and through the same unbalanced forces locks the locking bar 125 and thus locks the members together as a unit to turn the shaft.

It will be seen that with the constructions shown and described it is possible to take up a material amount of slack and that there will be a positive lock with immaterial backplay or backlash. The mechanism will maintain cable tension substantially uniform and the position of the member to be controlled and the controlling member will not vary during or because of the takeup.

While the preferred forms of the invention have been described, it will be apparent that other forms may be employed. There is no intention in describing only two forms of the invention to be limited to these particular forms.

What is claimed is:

1. In a cable tension regulator a driving member adapted to be fixed to a shaft, a pair of opposed dished sheaves each adapted to receive an end of a flexible cable rotatably mounted at opposite ends of said driving member in opposed, contiguous relationship to house said driving member, and all housed within said sheaves, a radially-extending rod mounted on said driving member, a centrally apertured lock bar slidably fitted on said rod by means of its aperture and extending on opposite sides of said rod, spring means engaging said lock bar centrally for moving it along said rod, comprising a coil spring surrounding said rod, a driving connection between said sheave and said lock bar comprising a pair of links, one pivoted to one sheave and to one end of said lock bar and the other pivoted to the other sheave and the other end of said lock bar and each adapted upon application of rotational force to its sheave to cant said lock bar on said rod whereby said sheaves and driving member are locked against relative movement.

2. In a cable tension regulator a driving member adapted to be fixed to a shaft, a pair of opposed dished sheaves each adapted to receive an end of a flexible cable rotatably mounted at opposite ends of said driving member in opposed, contiguous relationship to house said driving member, and all housed within said sheaves, a radially-extending guide mounted on said driving member, a lock bar slidably fitted on said guide and extending on opposite sides of said guide, spring means engaging said lock bar centrally for moving it along said guide, a driving connection between said sheave and said lock bar comprising a pair of links, one pivoted to one sheave and to one end of said lock bar and the other pivoted to the other sheave and the other end of said lock bar and each adapted upon application of rotational force to its sheave to cant said lock bar on said guide whereby said sheaves and driving member are locked against relative movement.

3. In a cable tension regulator a driving member adapted to be fixed to a shaft, a pair of opposed dished sheaves each adapted to receive an end of a flexible cable rotatably mounted at opposite ends of said driving member in opposed, contiguous relationship to house said driving member, and all housed within said sheaves, a radially-extending guide mounted on said driving member, a lock bar slidably fitted on said guide and extending on opposite sides of said guide, spring means engaging said lock bar in balanced relationship for moving it along said guide without canting, a driving connection between said sheave and said lock bar comprising a pair of links, one pivoted to one sheave and to one end of said lock bar and the other pivoted to the other sheave and the other end of said lock bar and each adapted upon application of rotational force to its sheave to cant said lock bar on said guide whereby said sheaves and driving member are locked against relative movement.

4. In a cable tension regulator a driving member adapted to be fixed to a shaft, a pair of opposed dished sheaves each adapted to receive an end of a flexible cable rotatably mounted at opposite ends of said driving member in opposed, contiguous relationship to house said driving member, and all housed within said sheaves, a guide mounted on said driving member, a lock bar slidably fitted on said guide and extending on opposite sides of said guide, spring means engaging said lock bar in balanced relationship for moving it along said guide without canting, a driving connection between said sheaves and said lock bar comprising a pair of links, one pivoted to one sheave and to one end of said lock bar and the other pivoted to the other sheave and the other end of said lock bar and each adapted upon application of rotational force to its sheave to cant said lock bar on said guide whereby said sheaves and driving member are locked against relative movement.

5. In a cable tension regulator a shaft member, a driving member fixed thereto, a pair of sheaves, each adapted to receive an end of a flexible cable and mounted for rotation around the axis of said shaft, a radially-extending rod mounted on said driving member, a centrally-apertured lock bar slidably mounted on said rod by means of its aperture and extending on opposite sides of said rod, spring means engaging said lock bar centrally for moving it along said rod, comprising a coil spring surrounding said rod, a driving connection between said sheaves and said lock bar comprising a pair of links, one pivoted to one sheave and to one end of said lock bar and the other pivoted to the other sheave and the other end of said lock bar and each adapted upon application of rotational force to its sheave to cant said lock bar on said rod whereby said sheaves and driving member are locked against relative movement.

6. In a cable tension regulator a shaft member, a driving member fixed thereto, a pair of sheaves, each adapted to receive an end of a flexible cable and mounted for rotation around the axis of said shaft, a radially-extending guide mounted on said driving member, a lock bar slidably mounted on said guide and extending on opposite sides of said rod, spring means engaging said lock bar for moving it along said guide without canting, a driving connection between said sheaves and said lock bar comprising a pair of links, one pivoted to one sheave and to one end of said lock bar and the other pivoted to the other sheave and the other end of said lock bar and each adapted upon application of rotational force to its sheave to cant said lock bar on said guide whereby said sheaves and driving member are locked against relative movement.

7. In a cable tension regulator a shaft member, a driving member fixed thereto, a pair of sheaves, each adapted to receive an end of a flexible cable and mounted for rotation around the axis of said shaft, a radially-extending guide mounted on said driving member, a lock bar slidably mounted on said guide and extending on opposite sides of said rod, spring means engaging said lock bar for moving it along said guide without canting, a driving connection between said sheaves and said lock bar comprising a driving connection between one sheave and one end of said lock bar and a driving connection between the other sheave and the other end of said lock bar, each driving connection comprising an internal ring gear carried by a sheave, a rack slidably mounted on said driving member parallel to said guide and operatively engaged with one end of said guide and gearing in mesh with said ring gear and said rack for sliding said rack on rotation of said ring gear and each adapted upon application of rotational force to its sheave to cant said lock bar on said guide whereby said sheaves and driving member are locked against relative movement.

8. In a cable tension regulator a driving member adapted to be fixed to a shaft, a pair of opposed, dished sheaves each adapted to receive an end of a flexible cable and rotatably mounted on opposite ends of said driving member in opposed contiguous relationship to house said driving member, and all housed within said sheaves, a radially-extending rod mounted on said driving member, a centrally-apertured lock bar slidably mounted on said rod by means of its aperture and extending on both sides of said rod, spring means engaging said lock bar centrally for moving it along said rod, a driving connection between one sheave and one end of said lock bar and a driving connection between the other sheave and the other end of said lock bar, each adapted upon application of rotational force to its sheave to cant said lock bar on said rod, whereby said sheaves and driving member are locked against relative movement.

9. In a cable tension regulator a driving member adapted to be fixed to a shaft, a pair of opposed, dished sheaves each adapted to receive an end of a flexible cable and rotatably mounted on opposite ends of said driving member in opposed contiguous relationship to house said driving member, and all housed within said sheaves, a guide mounted on said driving member, a lock bar slidably mounted on said guide and extending on both sides of said guide, spring means engaging said lock bar for moving it along said guide, a driving connection between one sheave and one end of said lock bar and a driving connection between the other sheave and the other end of said lock bar, each adapted upon application of rotational force to its sheave to cant said lock bar on said guide, whereby said sheaves and driving member are locked against relative movement.

10. In a cable tension regulator a driving member adapted to be fixed to a shaft, a pair of sheaves each adapted to receive an end of a flexible cable and rotatably mounted on said driving member, a radially-extending rod mounted on said driving member, a centrally-apertured lock bar slidably mounted on said rod by means of its aperture and extending on both sides of said rod, spring means engaging said lock bar centrally for moving it along said rod, a driving connection between one sheave and one end of said lock bar and a driving connection between the other sheave and the other end of said lock bar, each adapted upon application of rotational force to its sheave to cant said lock bar on said rod, whereby said sheaves and driving member are locked against relative movement.

11. In a cable tension regulator a driving member adapted to be fixed to a shaft, a pair of sheaves each adapted to receive an end of a flexible cable and rotatably mounted on said driving member, a guide mounted on said driving member, a lock bar slidably mounted on said guide and extending on both sides of said guide, spring means engaging said lock bar for moving it along said guide, a driving connection between one sheave and one end of said lock bar and a driving connection between the other sheave and the other end of said lock bar, each adapted upon application of rotational force to its sheave to cant said lock bar on said guide, whereby said sheaves and driving members are locked against relative movement.

12. In a cable tension regulator a driving member adapted to be fixed to a shaft, a pair of sheaves, each adapted to receive an end of a flexible cable and rotatably mounted on said driving member, a radially-extending rod mounted on said driving member, a lock bar slidably fitted on said rod by means of its aperture and extending on both sides of said rod, spring means engaging said lock bar centrally for moving it along said rod, a driving connection between one sheave and one end of said lock bar and a driving connection between the other sheave and the other end of said lock bar, each driving connection comprising an internal ring gear carried by a sheave, a rack slidably mounted on said driving member parallel to said rod and operatively engaged with one end of said rod and gearing in mesh with said ring gear and said rack for sliding said rack on rotation of said ring gear.

13. In a cable tension regulator a driving member adapted to be fixed to a shaft, a pair of opposed, dished sheaves each adapted to receive an end of a flexible cable and rotatably mounted on opposite ends of said driving member in opposed contiguous relationship to house said driving member, equalizing means operatively connected to said sheaves for simultaneously rotating them in opposite directions, a spring operatively connected to said equalizing means for actuating the same and a positive lock for said equalizing means and said driving member operatively associated with said sheaves for locking upon application of rotational force to one only of said sheaves, all enclosed within said sheaves.

14. In a cable tension regulator a shaft member, a driving member fixed thereto, a pair of sheaves, each adapted to receive an end of a flexible cable mounted for rotation around the axis of said shaft, equalizing means operatively connected to said sheaves for simultaneously rotating them in opposite directions, a spring operatively connected to said equalizing means for actuating the same and a positive lock for said equalizing means mounted on said driving member and operatively associated with said sheaves for locking upon application of rotational force to one only of said sheaves.

HERMAN WEBER.

REFERENCES CITED

The following references are of record in the file of this patent:

UNITED STATES PATENTS

| Number | Name | Date |
|---|---|---|
| 2,212,823 | Bulk | Aug. 27, 1940 |
| 2,371,130 | Cushman | Mar. 13, 1945 |
| 2,430,363 | Parkes et al. | Nov. 4, 1947 |

OTHER REFERENCES

Flight Magazine, pp. 424–425, October 17, 1946.